Patented May 21, 1940

2,201,237

UNITED STATES PATENT OFFICE 2,201,237

COMPOSITION OF MATTER AND METHOD OF PRODUCING

Edwin R. Littmann, Wilmington, Del., assignor to Hercules Powder Company, Wilmington, Del., a corporation of Delaware No Drawing. Application August 24, 1938, Serial No. 226,573

6 Claims. (Cl. 260—97)

This invention relates to new compositions of matter and methods of producing them. It relates more particularly to derivatives of dehydroabietic acid and to methods for their production.

In my co-pending application for United States Letters Patent, Serial No. 84,877, filed June 12, 1936, now United States Patent No. 2,154,877, which is in turn a continuation-in-part of my application for United States Letters Patent, Serial No. 6,403, filed February 13, 1935, I described a process for treating rosin, rosin acids, or other compounds containing the hydrocarbon nucleus of a rosin acid with an active hydrogenation catalyst, such as nickel, copper chromite, platinum, palladium, etc., to produce a change in the chemical and physical properties of the rosin or rosin derivative, the resultant product having a greatly decreased unsaturation and in many cases a higher melting-point and improved properties. These changes in the physical and chemical characteristics of the material are believed to be due to an intra- and inter-molecular rearrangement therein, with no change in the carbon skeleton. The process consists essentially of treating the rosin, rosin acid or compound containing the hydrocarbon nucleus of a rosin acid with the active hydrogenation catalyst at an elevated temperature, the optimum range being from about 150° C. to about 250° C.

Further examination of the product of the above treatment of rosin compounds has led to the observation that it consists of a mixture of at least two types of chemical compounds, the major portion containing an aromatic ring, another portion being a saturated derivative of the rosin compound. I have separated from the product obtained by the treatment of a rosin acid the major portion consisting of an acid which I have identified as dehydroabietic acid, inasmuch as it appears to contain two less hydrogen atoms than abietic acid, one aromatic ring, and has the known physical constants of dehydroabietic acid as described in the literature. The dehydroabietic acid may be separated from the treated rosin by various means, crystallization from a solvent solution being a practical method.

Thus, by way of example, to 125 parts by weight of the product of the treatment of "I" wood rosin with a palladium catalyst under the conditions described in the application, Serial No. 84,877, filed June 12, 1936, now United States Patent No. 2,154,877, are added 170 parts by weight of acetone. After heating to effect solution the product is cooled and the crystals separating are removed by filtration, washed with cold acetone and dried. Successive concentrations of the mother liquor yield additional crystals, a total yield of about 73 parts by weight of the crystalline material being obtained. Solvents such as ethyl acetate, ethyl alcohol, methyl alcohol, petroleum ether, etc. may be used in place of acetone.

The crystalline dehydroabietic acid isolated as above has been found to have the following characteristics:

| | |
|---|---|
| Melting point | °C.. 160–161 |
| Refractive index ($n_D^{20}$) | 1.5371 |
| Specific rotation | °C.. +60 |
| Neutral equivalent | 299.5 |
| Molecular weight | 300 |

It has been identified as having the following structural formula:

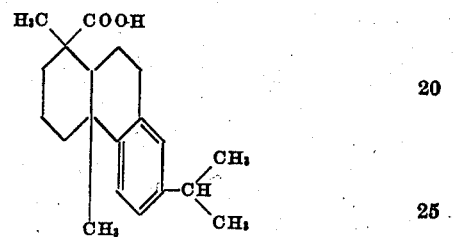

Other methods of preparing dehydroabietic acid have been described in the literature and the above structural formula has become quite definitely established as representing the configuration of the acid.

Now, in accordance with the present invention, I may prepare derivatives of dehydroabietic acid involving substitutions in the carboxyl group. As a general expression of my invention, the derivatives which I may prepare are expressed by the following general formula:

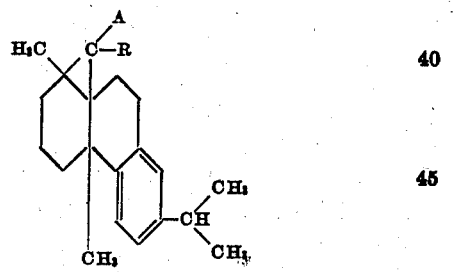

where A is a bivalent element or group such as O, S, H$_2$, NX, etc., where X is an organic radical; R is a monovalent group, such as OH, SH, O.SO$_3$H, O.SO$_3$ metal, O-metal, O-nitrogenous base, halogen, OX, SX, NH$_2$, NHX, NX$_2$, etc., where X is a monovalent organic radical.

Thus, in general, the derivatives of the dehydroabietic acid which I may prepare in accordance with this invention will be esters, salts, acyl halides, amides, primary alcohols, ethers, etc.

For example, where A is O and R is OX, wherein X is an organic radical, my new compositions will be esters of dehydroabietic acid. Where A is O and R is OM, wherein M represents a metal or nitrogenous base, my new compositions will be salts. Further, where A is O and R is a halogen such as Cl, Br, I, Fl, my new compositions will be acyl halides. Further, where A is O and R is NH$_2$, NHX or NX$_2$ my new composition will be an amide or a substituted amide. Further, where A is H$_2$ and R is OH, my new composition will be a primary alcohol. Further, where A is H$_2$ and R is OX, wherein X is an organic radical, my new compositions will be ethers.

As examples illustrating the preparation of esters of dehydroabietic acid in accordance with this invention, the following are cited:

*Example 1—Methyl dehydroabietate*

Twelve hundred parts by weight of dehydroabietic acid obtained in the manner described above are added to 1000 parts by weight of 40 per cent aqueous sodium hydroxide solution and 666 parts by weight of ethyl alcohol, cooling to about 25° C. To the above solution, which is about neutral, 500 parts by weight of dimethyl sulphate are added gradually, the temperature being held below about 40° C. When the addition of the dimethyl sulphate is completed, sufficient 40 per cent sodium hydroxide solution is added in small portions to keep the mixture slightly alkaline to phenolphthalein. Water is then added in equal volume and the ester is allowed to separate. After washing the ester with water and drying, it may be distilled under reduced pressure for purification. The methyl ester produced will be found to have the following characteristics and analysis:

Melting point, 60–61° C.
Boiling point, 168–170° C. at 2 mm.; 177–180° C. at 5 mm.
Refractive index $\left(n\frac{99}{D}\right)$, 1.5081.
Density $\left(d\frac{99}{4}\right)$, 1.0013.
Molecular weight, 314.
Methoxyl, 10.02 percent (calculated for C$_{21}$H$_{32}$O$_2$, 9.87 percent).
Molecular refraction (99°), 93.4 (calculated for C$_{21}$H$_{32}$O$_2$, 92.7).

The same methyl ester may be prepared by esterification of dehydroabietic acid with methanol under pressure or by heating the sodium dehydroabietate with a methyl halide.

*Example 2—Ethyl dehydroabietate*

Ten parts by weight of the acid chloride of dehydroabietic acid are heated under reflux with 2 parts by weight of ethyl alcohol for 16 hours. The ester is then recovered by evaporation of the alcohol and distillation of the residue under reduced pressure. By this procedure an ester having an ethoxy content of 11.0 per cent is obtained, which corresponds to a purity of about 81 per cent based on the calculated ethoxy content of 13.6 per cent of C$_{22}$H$_{34}$O$_2$.

*Example 3—Glyceryl dehydroabietate*

One hundred parts by weight of dehydroabietic acid and 12.2 parts by weight of glycerol are heated in a carbon dioxide atmosphere at a temperature of about 270° C. for approximately 6½ hours. The pressure is then reduced to about 15 mm. of mercury for about ½ hour and the excess glycerol distilled off while maintaining the temperature at 270° C. The reaction product is cooled to 200° C. under reduced pressure before discharging. It will have the following approximate analysis:

Acid number_____ 14
Melting point (Hercules drop method) __° C_ 104

The esters of dehydroabietic acid produced in accordance with this invention may be used as resins or plasticizers in coating compositions or they may be used as intermediates for the production of dyes and related products. They will be found to possess much greater resistance to oxidation than the corresponding abietic acid or rosin esters. They will also, in general, have higher melting points than the corresponding esters of abietic acid or rosin.

As examples illustrating the preparation of salts of dehydroabietic acid in accordance with this invention the following are cited:

*Example 4—Sodium dehydroabietate*

The sodium salt of dehydroabietic acid may be prepared by neutralizing the acid with aqueous or alcoholic solutions of sodium hydroxide, and removing the solvent by evaporation. It may be ground to a fine, white powder. It is very useful in soaps because of its high resistance to oxidation by atmospheric oxygen.

*Example 5—Manganese dehydroabietate*

To 61 parts by weight of dehydroabietic acid dissolved in about 50 parts by weight of alcohol are added 8 parts by weight of sodium hydroxide as a 10 per cent solution. Then 10 parts by weight of manganous sulphate dissolved in 200 parts by weight of water are added. The precipitated salt may be taken up in benzene and the solution evaporated nearly to dryness after filtering through fuller's earth. The remainder of the solvent may be removed by drying in an oven at about 200° C. in a current of carbon dioxide.

*Example 6—Cobalt dehydroabietate*

To 61 parts by weight of dehydroabietic acid dissolved in about 50 parts by weight of alcohol are added 8 parts by weight by sodium hydroxide as a 10 per cent solution. Then 12½ parts of cobalt acetate dissolved in 200 parts by weight of water are added. The precipitated cobalt dehydroabietate may be recovered by the procedure described in Example 4.

*Example 7—Zinc dehydroabietate*

To 61 parts by weight of dehydroabietic acid dissolved in about 50 parts by weight of alcohol are added 8 parts by weight of sodium hydroxide as a 10 per cent solution. Then 58 parts of hydrated zinc sulphate dissolved in 200 parts by weight of water are added. The precipitated zinc dehydroabietate may be recovered as in Example 4.

The manganese, cobalt and zinc salts as well as other polyvalent salts of dehydroabietic acid are very desirable as driers or thixotropic agents. They possess the unusual property of being highly soluble in organic solvents and oils and because of their stability to atmospheric oxygen remain in solution indefinitely.

As examples illustrating the preparation of acid chlorides of dehydroabietic acid in accordance with this invention the following are cited:

Example 8—Dehydroabietyl chloride

A mixture of 10 parts by weight of dehydroabietic acid and 6 parts by weight of thionyl chloride are heated together for about one hour at a temperature of about 100° C., or until evolution of hydrogen chloride has ceased. A small additional amount of thionyl chloride is then added to insure an excess and the unreacted thionyl chloride and other volatile materials removed by distillation at 50–60 mm. of mercury at about 100° C. The resulting acid chloride of dehydroabietic acid will have a chlorine content of about 12.9 per cent (calculated for $C_{20}H_{27}OCl$ is 11.1 per cent). It is a viscous liquid soluble in most organic solvents. For practical purposes it may be used without further purification.

Example 9—Dehydroabietyl chloride

The acid chloride of dehydroabietic acid may also be prepared by adding phosphorous trichloride to a benzene solution of dehydroabietic acid at a temperature of about 5° C. to about 10° C., warming gradually to 50° C. after the addition. The solution is then decanted from the phosphorous acid and evaporated under reduced pressure. Analysis of the product will show a chlorine content of about 10.2 per cent (calculated for $C_{20}H_{27}OCl$ is 11.1 per cent).

In place of phosphorous trichloride the tribromide may be used similarly to give dehydroabietyl bromide. The acid halides of dehydroabietic acid are valuable in the synthesis of other derivatives.

Examples illustrating the preparation of amides of the dehydroabietic acid in accordance with this invention are the following:

Example 10—Dehydroabietyl anilide

To a mixture of one part by weight of dehydroabietyl chloride, prepared as in Examples 8 and 9, dissolved in about 15 parts by weight of petroleum ether, 0.6 part by weight of aniline dissolved in about 4 parts by weight of ethyl ether is added. The precipitate which forms is extracted twice with petroleum ether. The solid is then extracted with 2 per cent hydrochloric acid, filtered and washed with water. Further purification by reprecipitating the product from ethyl ether by addition of petroleum ether gives an anilide which shows no chlorine content and which has a melting-point of about 131–137° C. with gelation and a nitrogen content of about 4.14 per cent (nitrogen content calculated for $C_{26}H_{33}ON$ is 3.74 per cent).

Example 11—Dehydroabietyl amide

Dehydroabietyl chloride prepared as in Examples 8 and 9 above is dissolved in petroleum ether and treated with anhydrous ammonia. A white precipitate forms. For purification the petroleum ether may be evaporated, the product extracted with hot water and the heavy oil separating treated with ethyl ether to cause it to granulate. After removal of the ether the product may be dissolved in acetone and reprecipitated with petroleum ether. The purified dehydroabietyl amide prepared in this way is a white, granular solid.

Example 12—Dehydroabietyl naphthamide

A mixture of 1.6 parts by weight of dehydroabietyl chloride prepared as in Examples 8 and 9 above and 0.7 part of beta-naphthylamine are heated together to a state of quiet fusion. The product is then crystallized from 80 parts by weight of acetone. The naphthamide is obtained as white, silky needles having a melting-point of 182–184° C. and a nitrogen content of 3.04 per cent (calculated for $C_{30}H_{35}ON$ is 3.29 per cent).

The amides of dehydroabietic acid are useful as dye intermediates or as rubber chemicals.

As examples to illustrate the preparation of a primary alcohol derivative of dehydroabietic acid the following are cited:

Example 13—Dehydroabietyl alcohol

A mixture of 30 parts by weight of methyl dehydroabietate and 35 parts by weight of ether is reduced with 6 parts by weight of copper chromite catalyst at a temperature of about 266° C. to about 288° C. and a hydrogen pressure of about 3,000 pounds per square inch for about 5 hours. The product is then filtered thru fuller's earth and the solvent evaporated. The dehydroabietyl alcohol may be purified by distillation or other suitable means. The dehydroabietyl alcohol prepared as above will contain about 80 per cent of the alcohol and will boil at about 169° C. to about 171° C. at a pressure of 4 mm. mercury. Dehydroabietic acid may be used in place of the methyl ester in the reduction with copper chromite.

Example 14—Dehydroabietyl alcohol

To 20 parts by weight of sodium powdered in toluene, 20 parts by weight of methyl dehydroabietate dissolved in 200 parts by weight of tertiary butyl alcohol are added with vigorous agitation and under reflux. After the reduction is complete the solvent is removed by steam distillation and the dehydroabietyl alcohol is removed from the aqueous by-products by decantation. The alcohol may be purified by extraction with petroleum ether and distillation under reduced pressure.

The dehydroabietyl alcohol will find numerous uses in the synthesis of other derivatives such as esters, ethers, etc., which in turn will find use in coating compositions, for example.

It will be understood that the details and examples hereinbefore set forth are illustrative only, and that the invention as herein described and claimed is in no way limited thereby.

It will also be understood that the term dehydroabietic acid used herein in the examples and claims refers to the particular acid known in the literature by that name and represented by the structural formula presented herein.

What I claim and desire to protect by Letters Patent is:

1. As new compositions, compounds derived from dehydroabietic acid having the following general formula:

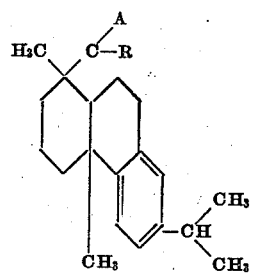

wherein A is selected from the group consisting of O, S, H$_2$, NX; and R is selected from the group consisting of OH, SH, O.SO$_3$H, O.SO$_3$ metal, O-metal, O-nitrogenous base, halogen, OX, SX, NH₂, NHX, NX₂, in which X is a monovalent organic radical.

2. As new compositions, compounds derived from dehydroabietic acid having the general formula shown in claim 1, wherein A is O and R is OX, in which X is a monovalent organic radical.

3. As a new composition, the compound having the formula:

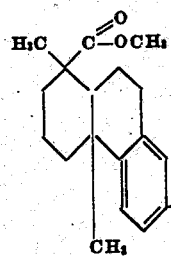

4. As new compositions, salts derived from dehydroabietic acid having the general formula shown in claim 1, wherein A is O and R is OM, in which M is a member of the group consisting of a metal and a nitrogenous base.

5. As a new composition, the salt having the formula:

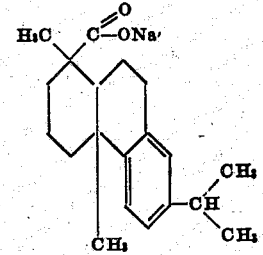

6. As a new composition, the compound having the formula:

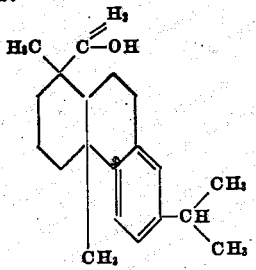

EDWIN R. LITTMANN.